MANUAL TWO-TO-FOUR-WIRE TELEPHONE SIGNAL CONVERTER

Filed March 17, 1967 2 Sheets-Sheet 1

INVENTORS,
JOHN F. FAUGHNAN
JOSEPH D. VINSO.
BY Harry M. Saragovitz
Edward J. Kelly, Herbert Berl
& Julian C. Keppler
ATTORNEYS

MANUAL TWO-TO-FOUR-WIRE TELEPHONE SIGNAL CONVERTER

Filed March 17, 1967 2 Sheets-Sheet 2

INVENTORS,
JOHN F. FAUGHNAN
JOSEPH D. VINSO.
BY Harry M. Saragovitz, Edward J. Kelly, Herbert Berl & Julian C. Keppler.
ATTORNEYS 3,514,547

MANUAL TWO-TO-FOUR-WIRE TELEPHONE SIGNAL CONVERTER

John F. Faughnan, Neptune, and Joseph D. Vinso, Linden, N.J., assignors to the United States of America as represented by the Secretary of the Army Filed Mar. 17, 1967, Ser. No. 624,675
Int. Cl. H04m 7/00
U.S. Cl. 179—27 1 Claim

ABSTRACT OF THE DISCLOSURE

A manual two-to-four-wire telephone converter having send and receive pairs of terminals for connection to a four-wire switching center, a jack for reception of a two-wire circuit plug, and a hybrid coil for passing audio signals between said jack and said send and receive terminals. A pair of detectors connected to said receive terminals operate a logic circuit in response to four-wire control signals applied to said receive terminals. The logic circuit controls a four-wire signal generator and switchboard control signals for applying control signals to the send terminals and for signalling the operator respectively. A manual relay is provided for connecting the jack to the hybrid and for manually controlling the switchboard signals and the four-wire signal generator. The present converter, being small and inexpensive, is capable of being incorporated in and conforming to present manual switchboards, thereby eliminating the need of operators at four-wire centers.

BACKGROUND OF THE INVENTION

The present invention relates to telephone systems and more particularly to a two-to-four-wire telephone signal converter.

In the field of telephony, it has been the general practice to provide signal converter equipment for interconnecting conventional two-wire telephone equipment to the newer electronic four-wire equipment. Present converter equipments located at a four-wire automatic switching center, however, are usually large, expensive systems. The location of converters at such centers also results in the necessity of having operators located at such centers. Those concerned with the development of tactical military communications have recognized the need of a small, inexpensive converter which may be incorporated in present manual switchboards thereby eliminating the need of additional operators located at the four-wire switching centers.

SUMMARY OF THE INVENTION

It is the general purpose of this invention to provide a simple, inexpensive converter to be used as an interface on a manual switchboard for the selective connection of the two-wire terminals thereof to a four-wire switching center. All necessary supervisory signals are generated by the converter thereby eliminating the need of an additional operator located at the four-wire switching center.

BRIEF DESCRIPTION OF THE DRAWINGS

The exact nature of this invention as well as other objects and advantages thereof will be readily apparent from consideration of the following specification related to the annexed drawing in which.

DESCRIPTION OF THE PREFERRED EMBODIMENT

Figure 1:
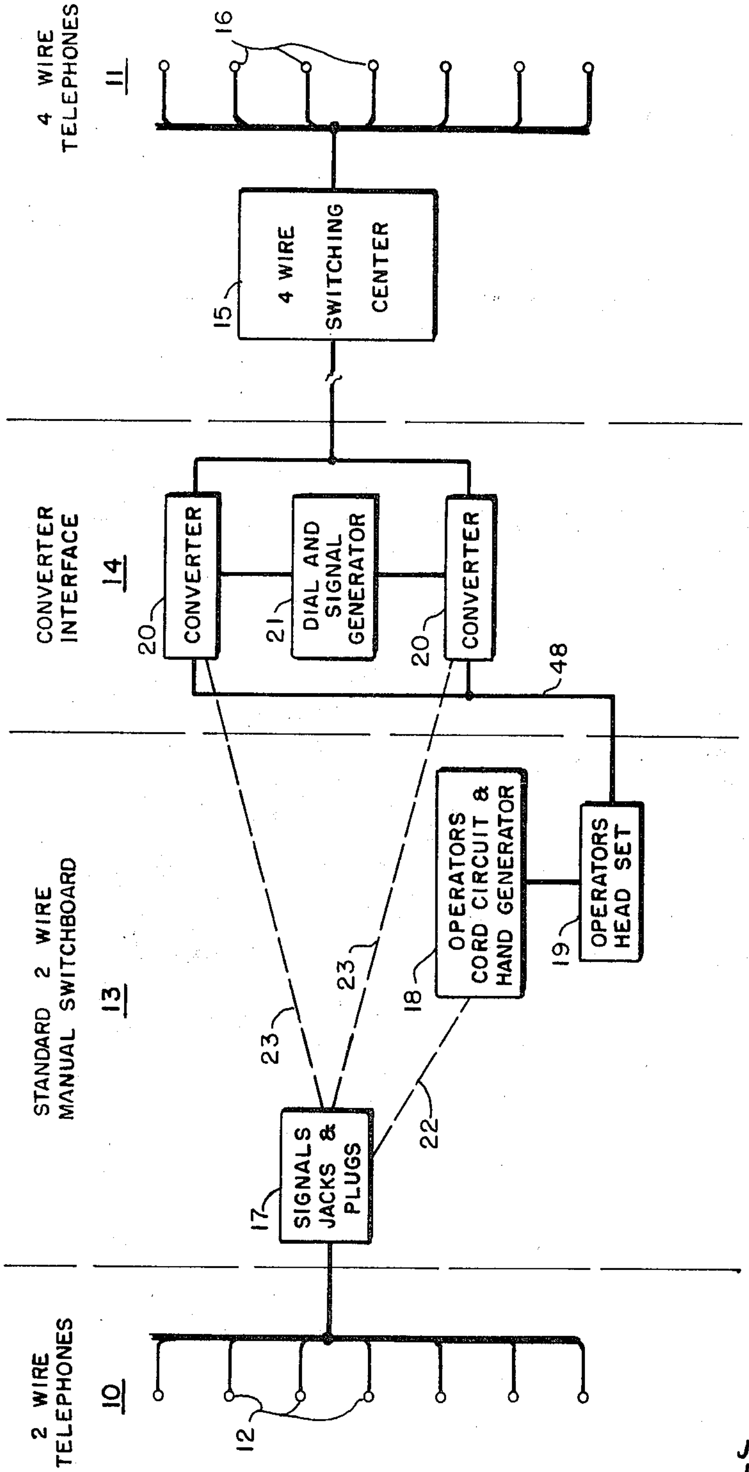
FIG. 1 shows a block diagram of a system employing the invention.

Referring now to the drawings, wherein like reference characters designate like or corresponding parts through the several views, there is shown in FIG. 1 a two-wire telephone system 10 interconnected to a four-wire telephone system 11. The two-wire system 10 comprises a plurality of standard two-wire telephones 12 connected to a standard two-wire switchboard 13. A two-to-four-wire converter interface 14 provided at the switchboard 13 is connected to a standard automatic four-wire switching center 15 which in turn is connected to a plurality of four-wire telephones 16.

The switchboard 13 includes a standard assembly of signals, jacks, and plugs represented by box 17. Each signal, jack, and plug of assembly 17 is selectively connected to an associated telephone 12. A standard operator's cord circuit and hand generator and the associated switching circuitry 18 is provided in the usual manner. An operator's head set 19 is connected to the operator's cord circuit 18.

The interface 14 includes a plurality of converters 20 (only two shown) and a common dial and signal generator assembly 21 connected thereto. The operators head set 19 is connected to each of the converters 20. The operators head set 19 can be connected to one of the telephones 12 by inserting the plug of the operators cord circuit 18 into an appropriate jack of the assembly 17; the dashed line 22 indicates this connection. A connection between a two-wire telephone 12 and a four-wire telephone 16 is completed through one of the converters 20 by inserting the appropriate plug of the assembly 17 into the jack of one of the converters 20. The dashed lines 23 show two such connections.

Figure 2:
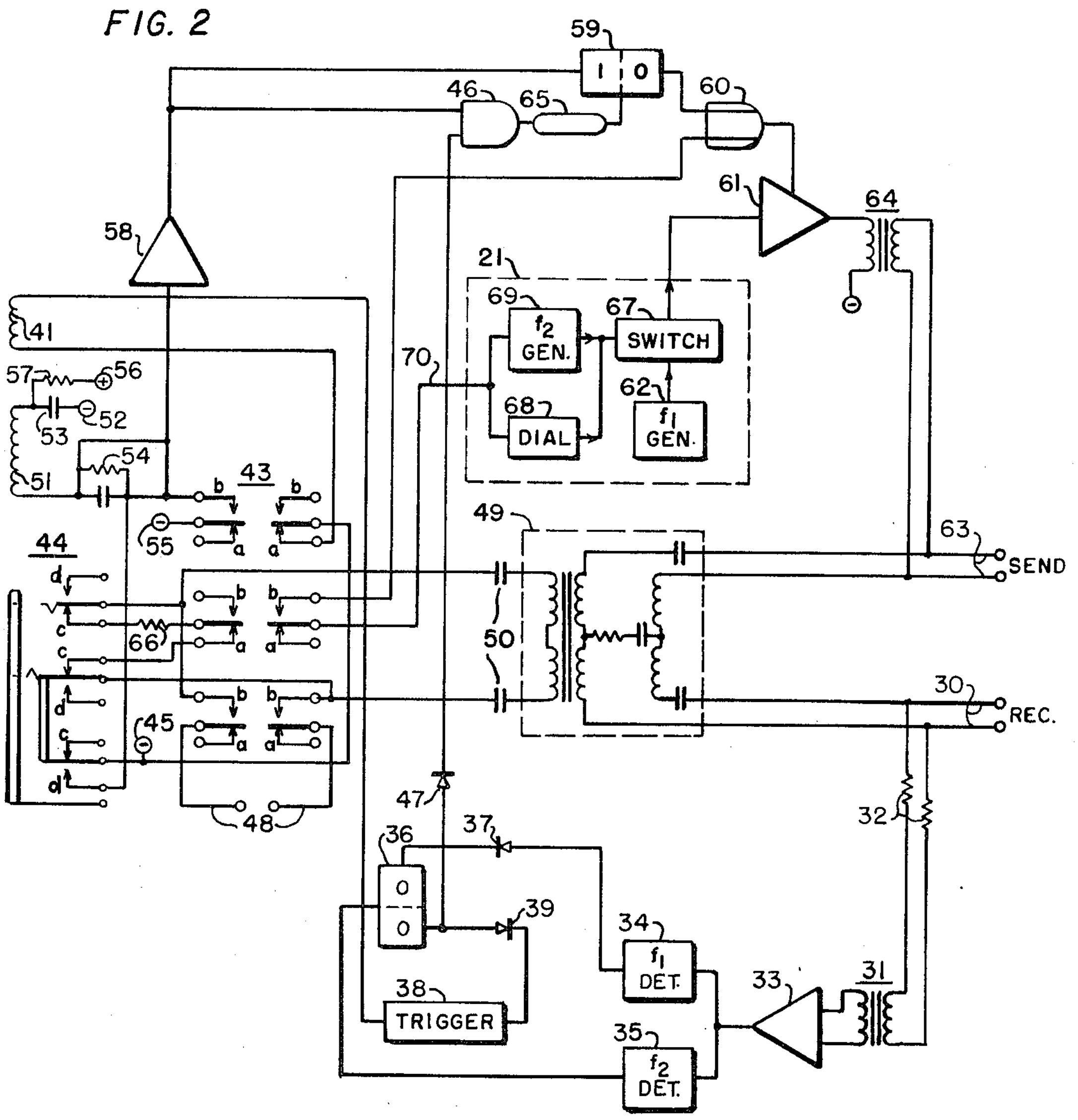
FIG. 2 illustrates a diagram of a preferred embodiment of the invention.

Because communications in a tactical situation requires that the switchboards 13 be small, light, portable, and simple, it is also understandable that the converter interface 14 should have similar characteristics. Of course, if the converters were loaded at large permanent four-wire switching centers there would be no problem of additional weight and size being added to the switchboard 13. However, in such cases each four-wire station would be required to have an operator in attendance in addition to the usual operators located at the manual switchboard 13. The present invention avoids the use of the additional operator while keeping to a minimum the additional weight and size. The converter 20 shown in detail in FIG. 2 will be discussed while tracing first an incoming call and then an outgoing call.

Therefore, let it first be assumed that a call is initiated at one of the four-wire telephones 16. The center 15 will choose an outgoing line therefrom and send a seize signal $f_1$, which will be received on the receive lines 30 of converter 20. This seize signal $f_1$ will be applied to the transformer 31 via current limiting resistors 32. A constant output amplifier 33, connected to the secondary of transformer 31, will apply the seize signal $f_1$, to a pair of frequency detectors 34 and 35. Detector 34, being tuned to frequency $f_1$, will apply an input pulse to set flip-flop 36 via blocking diode 37. The output of flip-flop 36 will now go positive thereby applying an input to trigger circuit 38 via blocking diode 39. Trigger 38, which could be a one-shot multivibrator, would now apply a timed pulse to coil 41 to operate a magnetic toggle signal (not shown). It is noted that the lower side of coil 41 is connected through the contacts of manual trip switch 43, which is normally in position *a*, to negative terminal 45. Energization of coil 41 will operate the toggle signal which will indicate to the operator that an incoming call is being requested. This signal can only be restored by energizing coil 51 as will be described later. The output of flip-flop 36 is also applied as one input to an AND gate 46 through a blocking diode 47.

The incoming call is answered when the operator moves the manual trip switch 43 to position *b*. As shown in FIG. 1, the operators head set 19 is connected to the converters 20 via a line 48. Therefore, line 48 in FIG. 2 will now be connected across the hybrid repeating coil 49 through blocking capacitors 50 and the contacts of trip switch 43 which are now in position *b*. Moving the contacts of switch 43 to position *b* also removes load resistor 66 from the input to hybrid 49 and completes a signal restoring circuit which includes negative terminal 52, capacitor 53, coil 51, and negative terminal 55. Since capacitor 53 was initially charged from positive terminal 56 through resistor 57, the energy contained in capacitor 53 will energixe coil 51 as it discharges through the signal restoring circuit. The negative voltage at terminal 55 will also be inverted by inverter 58 and applied as a second input to the AND gate 46. It is pointed out that the flip-flop 36, which was previously set, provides the first input to AND gate 46. The inverted signal from 58 will also be applied as a set signal to flip-flop 59.

The output of the flip-flop 59 is connected to OR gate 60 which in turn will enable gate 61. The input to gate 61 is connected to the dial and signal generator assembly 21 which includes signal generators 62, 69, and 68. The interconnecting switch 67 is such that the signal $f_1$ from generator 62 is normally connected to the input of gate 61. For reasons which will be later explained, when one of the generators 69 or 68 is manually operated the switch 67 will remove the signal $f_1$ from the line and pass the signal of the operated generater to gate 61.

Since gate 61 has been enabled, the signal $f_1$ will now be applied to the four-wire send conductors 63 via transformer 64. Signal $f_1$ will indicate to the four-wire switching center 15 that the incoming call has been answered. Upon receiving signal $f_1$, center 15 will automatically remove its seize signal $f_1$ from the conductors 30.

The output of the AND gate 46 is applied to the reset input of flip-flop 59 via a time delay circuit 65. Therefore, after a predetermined time delay, the flip-flop 59 will be reset and the line tone gate 61 will be inhibited thereby removing the signal $f_1$ from the lines 63.

The operators head set 19 is now connected across the hybrid 49 via lines 48 and the four-wire subscriber may now request a particular two-wire subscriber. If at this time the operator should desire to put the four-wire subscriber on "hold" the operator may simply return the contacts of switch 43 to the *a* position. When the operator returns to the circuit by moving the contacts of switch 43 back to the position *b* the voltage at terminal 55 will again set flip-flop 59 with a resulting short burst of signal $f_1$ being applied to lines 63. This signal $f_1$ will be shut off after the flip-flop 59 is reset by the pulse from delay 65, thereby inhibiting the tone gate 61. If the operator wished to "hang up" or disconnect the four-wire subscriber from the line 63, the operator would manually operate the signal generator 69 to apply a release signal $f_2$ to lines 63. The four-wire center would detect signal $f_2$ and automatically release the converter 20. It is pointed out that the generator 69, when manually operated, will provide an enable signal to gate 61 via line 70, the associated contacts of switch 43 which must be in position *b*, and the OR gate 60. Also, when switch 67 receives the signal $f_2$, the signal $f_1$ from generator 62 will be disconnected from the line to gate 61 and the signal $f_2$ will be applied thereto.

After the four-wire subscriber requests a particular two-wire subscriber, the operator will select the appropriate cord 23 from the two-wire switchboard 13 and insert it into the jack 44 of the converter 20. The operator will also insert the operators cord 22 into the appropriate switchboard jack of assembly 17 and ring the two-wire subscriber. Ringing current will then pass from hand generator 18 through cord 22, the jack of assembly 17 and the ringer of the appropriate telephone 12.

When the plug of two-wire cord 23 of the switchboard assembly 17 is inserted in jack 44 the contacts thereof will be moved to position *b*. Load resistor 66 will be disconnected from the tip contact and terminal 45 will be connected to filter 54. The cord 23 will now be connected across the hybrid 49 via capacitors 50 and the ring and tip contacts of jack 44. The operator may now enter or leave the circuit by moving the trip switch 43 to the positions *b* or *a*.

The subscriber on the two-wire telephone 12 will signal the operator when the call is completed by sending a signal from the telephone 12 to the associated signal of the array 17. When the operator receives this signal he will remove the associated cord 23 from the jack 44 of the converter 20. When the subscriber on the four-wire telephone 16 hangs up a signal $f_2$ will be sent by the four-wire switching center 15 over lines 30 to the converter 20. This signal $f_2$ will be detected by detector 35 which in turn will reset the line condition flip-flop 36. With the flip-flop 36 now reset, the converter 20 will be in the normal condition and ready for another incoming call. It is pointed out that the coil 41 may only be energized by the setting of flip-flop 36 when the contacts of switch 43 are in position *a*. Because of this, a priority call may be initiated by a four-wire telephone 16 while a conversation is already taking place between a two-wire telephone 12 and another four-wire telephone 16. In such a case the center 15 would first send a signal $f_2$ over lines 30 to reset flip-flop 36. Then the seize signal $f_1$ may be sent over lines 30 which will now set flip-flop 36 and thereby energize coil 41. The operator will set the signal and move the contacts of switch 43 to position *b* to answer the new call. Of course, the first caller will now be asked to hang up and the operator will proceed in the usual manner.

The procedure will now be detailed for the case where the call is initiated at one of the two-wire telephones 12. The two-wire subscriber will initiate the call by ringing the operator and thereby operate the associated signal of the array 17. The operator will then select the appropriate cord 23 of array 17 and insert the plug in jack 44. This will move the contacts of jack 44 to position *d* and thereby connect the cord 23 to the hybrid 49, disconnect the load resistor 66, set flip-flop 59 through inverter 58, and provide an input to AND gate 46. Setting flip-flop 59 will enable gate 61, thereby sending a seize signal $f_1$ from generator 62 over lines 63. When the four-wire switching center has been seized, a signal $f_1$ will be returned over lines 30 thereby setting flip-flop 36 via transformer 31, amplifier 33, detector 34, and diode 37. The contacts of switch 43 will be in position *b* at this time and coil 41 will therefore not be energized. However, there will be an input signal to AND gate 46 from flip-flop 36 through diode 47. AND gate 46 will now provide a time-delayed pulse to reset flip-flop 59 via delay 65. Resetting flip-flop 59 will inhibit gate 61 and thereby remove the seize signal $f_1$ from lines 63. The signal $f_1$, which was sent on lines 30 from the four-wire center, will also be removed at this time. The operator may now proceed to dial the number of the particular four-wire subscriber by operating the dial generator 68. Operation of the dial generator will automatically provide an enable pulse to gate 61 via line 70, the contacts of switch 43, which are now in position *b*, and the OR gate 60. Also, the switch 67 will remove the signal $f_1$ from the line and pass the dialing signals. The dial generator 68 may be any of the well-known key senders used in standard four-wire systems.

It is pointed out that the switch 67 may be standard single-pole double-throw switch which is biased normally closed to pass $f_1$ and will be operated to a second position upon energization by the output of either generator 68 or 69 to pass the outputs thereof.

Once the four-wire subscriber has answered the call the operator can remove the head set 19 from the circuit by operating the switch 43. The connection is now complete and the hang up procedure is the same as described earlier.

Obviously many modifications and variations of the present invention are possible in the light of the above teachings. It is therefore to be understood, that within the scope of the appended claims, the invention may be practiced otherwise than as specifically claimed.

What is claimed is:

1. A converter for interconnecting a two-wire circuit telephone system to a four-wire circuit telephone system having send and receive conductor pairs comprising; a jack means for reception of a two-wire circuit plug means; hybrid repeater coil means having first, second, and third pairs of terminals for passing audio signals from said first pair of terminals to said second pair of terminals and from said third pair of terminals to said first pair of terminals; means for selectively connecting said jack means to said first pair of terminals; conductor means for connecting said second and third pair of terminals to said send and receive conductor pairs; signal means; detector means connected between said conductor means and said signal means for setting said signal means in response to electrical supervisory signals received over said conductors; means for resetting said signal means in response to the insertion of said plug means in said jack means; signal generating means for generating supervisory signals; manual control means for selectively transmitting said last mentioned supervisory signals over said conductor means; and automatic control means for automatically transmitting said last mentioned supervisory signals over said conductors.

References Cited

UNITED STATES PATENTS 3,156,775 11/1964 Ioakimidis et al.

KATHLEEN H. CLAFFY, Primary Examiner

T. W. BROWN, Assistant Examiner

U.S. Cl. X.R.

179—170